Jan. 26, 1943.   H. A. J. THIESEN   2,309,283
WINDMILL
Filed July 31, 1940   2 Sheets-Sheet 1
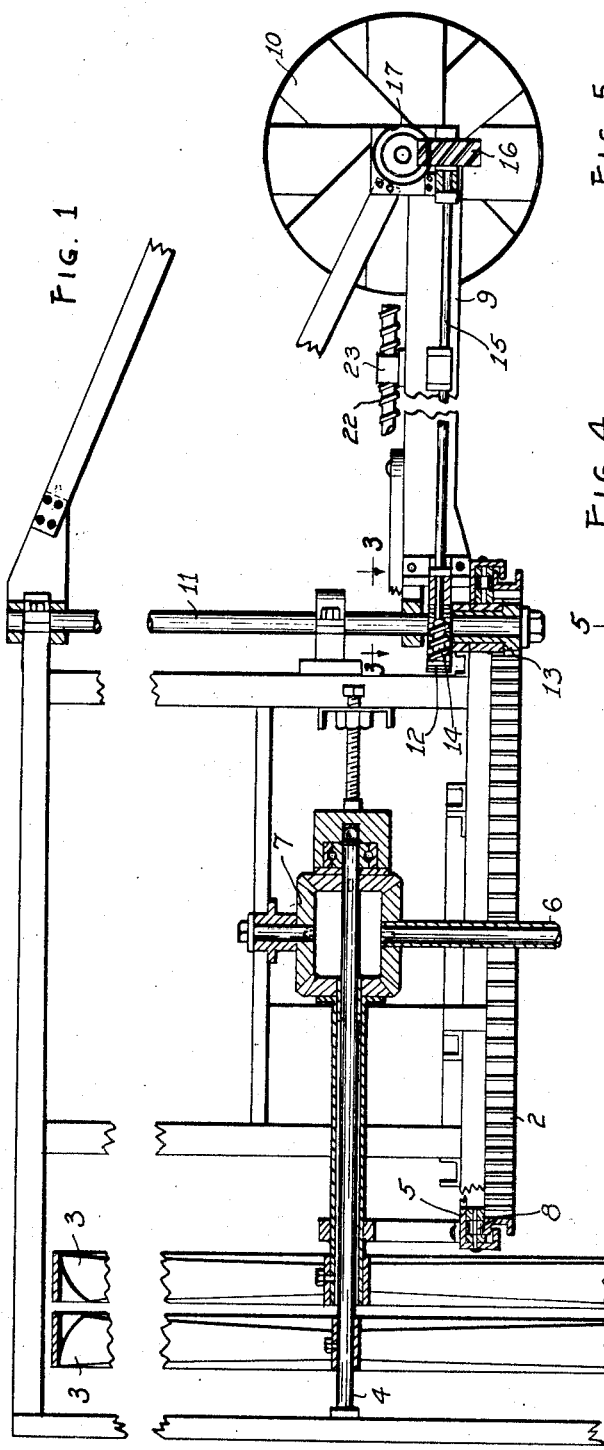
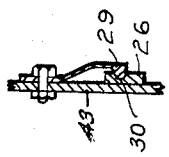
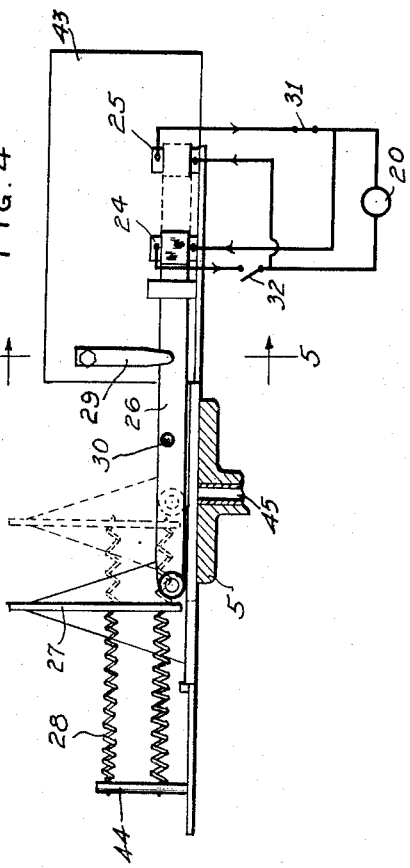
Inventor
HUGO A. J. THIESEN
By Ben V. Zillman
Attorney Jan. 26, 1943.  H. A. J. THIESEN  2,309,283
WINDMILL
Filed July 31, 1940  2 Sheets-Sheet 2
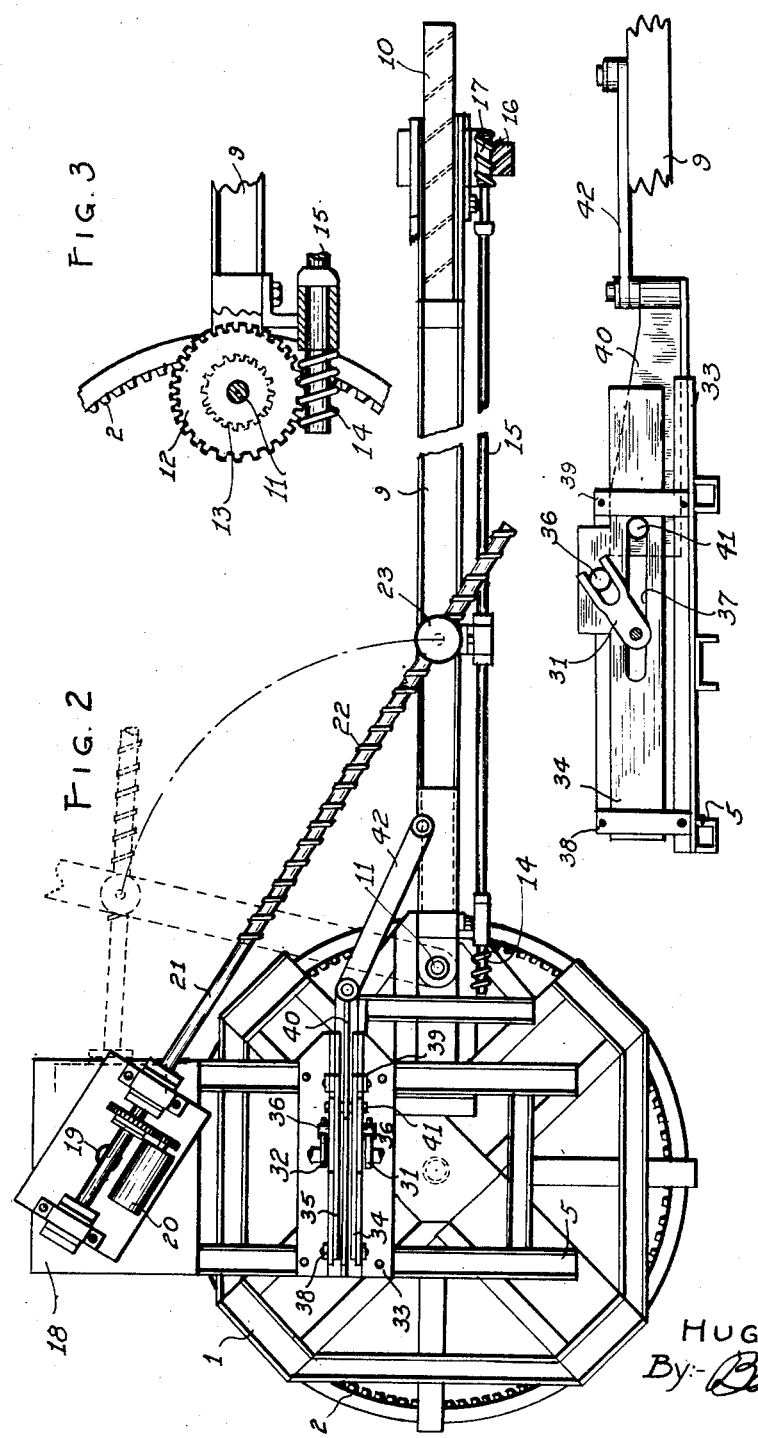
Inventor
HUGO A. J. THIESEN
By: Ben V. Zillman
Attorney Patented Jan. 26, 1943

2,309,283

UNITED STATES PATENT OFFICE 2,309,283

WINDMILL

Hugo A. J. Thiesen, St. Louis, Mo.

Application July 31, 1940, Serial No. 348,781

4 Claims. (Cl. 170—41)

The invention relates broadly to windmills, but more particularly to a steering tail for the same, which shall be operable by the wind to keep the windmill in its most effective power-generating position during changes in wind direction, but wherein the parts will in addition, be automatically shifted to an inoperative position during such periods when the wind pressure is over and above the safe amount for power generation and tends to damage the mechanism of the windmill, and more particularly the tail structure.

The invention has among its other objects, the construction of a windmill of the kind described, which shall be simple in construction and operation, economical to build and use, sturdy, safe, and which shall be otherwise satisfactory for use wherever deemed applicable.

Another object of my invention is to provide wind-controlled means for operating the tail to its inoperative position, and for retrieving the tail therefrom to operative position again as soon as the wind pressure drops to the normal safe pressure, and in which there will be means for stopping said movements of the tail in either of said directions of movement at substantially the end of movement, so as to avoid any possibility of breaking or otherwise damaging the mechanism shifting said tail, or the tail itself.

Many other objects and advantages of the construction herein shown and described, will be obvious to those skilled in the art to which this invention appertains, as will be apparent from the disclosures herein given.

To this end, my invention consists in the novel construction, arrangement and combination of parts herein shown and described, and the uses mentioned, as will be more clearly pointed out in the claims hereunto appended.

In the drawings, wherein like reference numerals indicate like or corresponding parts throughout the views, Figure 1 is a transverse cross-sectional view of the upper portion of a windmill, with some of the control means omitted therefrom;

Figure 2 is a top plan view of the windmill, with some of the parts shown in Fig. 1 omitted therefrom;

Figure 3 is a fragmentary detail of the steering mechanism; taken substantially along the line 3—3 of Fig. 1;

Figure 4 is a side elevation, with parts in section and other parts in diagrammatic representation, of the swinging control;

Figure 5 is a fragmentary detail of spring and detent holding means, taken substantially on the line 5—5 of Fig. 4; and Figure 6 is a side elevation of the switch-control means.

Referring more particularly to the drawings, wherein I have illustrated a preferred embodiment of my invention, there is shown a windmill for generating power directly from the wind itself and from whence this power may be transmitted in any desired manner to the desired point. The tower or other framework 1 is built to such a height as to be in the path uninterruptedly of the winds traversing that area, there being a ring gear 2 fixed to the cap of said tower.

One or more wind-wheels constituting the power wheels 3 are affixed to shafts 4 suitably journalled in the rotatable part of the framework 5, which in turn is supported on the cap of the tower. The shafts 4 are drivingly connected to a driven shaft 6 extending vertically through the tower, by suitable intermediate means such as the gearing 7 or the like. Obviously, the wind impinging on the vanes of the power wheels 3 will rotate the latter and will in turn rotationally drive the shaft 6 and from whence the power may be taken off as in pumping, running an electrical generator or in many other ways.

The uppermost or rotary part of the framework 5 is supported on the top of the tower, but there are one or more anti-friction means positioned intermediate the two, as for example the rollers 8. Although the device as aforesaid will transmit power while the wheels are headed in the wind-receiving direction, other means must be provided for steering the wheels into the said direction so as to catch the variations in wind direction, and to this end, there is a tail of elongated shape 9, to the outermost end of which there is rotatably mounted a second vane, wheel, rotor, turbine, etc., 10, so arranged that the latter is substantially idle while the wind is driving the power wheels, but when the direction of the wind changes, either to the right or to the left, the wind will then drive the tail wheel, and which action will steer the device, in a manner to be hereinafter set forth in detail.

The innermost end of the tail is pivotally mounted on an upright post 11 carried by the upper part 5 of the framework, somewhat as shown, and rotatably mounted on said post are a pair of drivingly interconnected gears 12 and 13 vertically apart, the latter meshing with the gear teeth of the ring gear 2 at all times. The other gear 12 is in constant mesh with a worm 14 at the end of a shaft 15 carried by the tail longitudinally of the latter, the opposite end of said shaft 15 having a gear 16 in mesh with a worm 17 keyed on the drive shaft of the tail wheel 18. In this manner, rotation of the tail wheel will drive the gear 13 through the two worms and cause said gear 13 to ride about the teeth of the ring gear until the wind no longer is sufficient to drive the tail wheel. The movement of the tail in this manner, will of course, transmit the corresponding movement to the framework of the upper portion 5, carrying the power wheels with it, and thereby present the latter into the teeth of the wind again until another shift in the direction of wind occurs. This shifting of the tail may be either to the right or to the left, as the case may be, dependent, of course, upon the direction of wind, but in either case the tail will steer the power wheels to head in the right direction.

In the event of the wind pressure becoming too high, so as to render the same unsafe for driving the windmill, and particularly probable to damage the tail of the device, inasmuch as the tail is generally quite long and hence is more easily damaged than the power wheels proper, it is desirable that the tail be placed close against the tower so as to present as small an area as possible to the wind, and reduce the leverage acting on the tail wheel tending to overturn the structure or the like.

Therefore, I have so constructed a control, that it will be automatically set into operation as soon as the wind reaches a dangerously high pressure, say as in a storm, or at a predetermined amount of about thirty miles per hour wind velocity, this control shifting the tail to an inoperative position during this excessive wind pressure and retrieving the same to normal position as soon as the wind pressure has safely abated.

Mounted on the rotatable part of the tower is a small platform 18, and on the latter is pivotally mounted as at 19, a reversible electrically or otherwise suitably driven motor 20 driving a shaft 21 which is threaded or provided with a worm 22 over the major part of its length and the other end of said shaft being threadedly received in a cooperating threaded socket 23, the latter being in turn pivotally mounted intermediate the ends of the tail so that as the shaft 21 is rotatably driven by the motor 20 in one direction, it will shorten the distance between its motor-attached end and the socket 23 to pull the wind wheel and tail structure toward each other about its point of pivotal securement with the post 11 to thereby have the tail out of alignment with the shaft 4 of the power rotor 3 and thereby decrease the likelihood of overturning the top of the tower by the wind. When the shaft 21 is driven in the reverse direction of drive by said motor, the tail will again be in alignment with said power wheel shaft, such pivotal movement shifting the power wheels and tail together inasmuch as the two units are geared together through the gear 13 and the ring gear 2.

In order to cushion the shifting movement at substantially the ends of said operations in both directions, I have provided switches that cooperate in a set sequence with the motor controls. The two circuits through the reversible motor are represented diagrammatically, there being arrows to indicate the direction of flow of current through the motor, and in which 24 indicates a pair of contacts making the circuit in one direction through the motor, and 25 indicating the other pair of contacts for directing the current in the other direction.

A main circuit closer 26, as of the elongated form shown and having its forward end insulated from the body of the same, is pivotally connected at one end to a wind-controlled plate 27 slidably mounted to be movable longitudinally between guideways, said plate being placed at any desired location, there being a fixed tail piece 43 to coact with said plate so as to keep the latter directly into the wind, as for example, by mounting the movable plate and its fixed tail piece on a base or carrier 44 that is in turn freely rotatable on a vertical spindle or axle 45 adjacent the top of the tower. One or more springs 28 yieldably prevent said plate from movement in one direction, and retrieve the same when the actuating force of the wind drops sufficiently. Normally, the position of the plate, always maintained directly into the wind by the tail piece 43 regardless of the position of the wind-wheel, inasmuch as the base 44 is rotatable independently of said wheel is such that the element 26 will bridge the contacts 24, as shown in full lines, but as soon as the wind pressure becomes strong enough to overcome the pull of the springs 28, the plate 27 and the element 26 carried thereby will be actuated by said wind to the position shown in the dotted lines, wherein the element 26 will bridge across the pair of contacts 25 and hence tend to reverse the motor as will be described. The element 26 is resiliently held in its last-mentioned position by engaging a spring detent 29 in an opening 30 provided in the element 26.

In order to shut off the motor current at substantially the end of travel of the shiftable control member in both directions, I have provided the switches 31 and 32, respectively, adapted to be operated alternately so that as one of them is opened the other one is closed. A supporting plate 33 is mounted adjacent the innermost end of the tail, the former being fixed relatively to the latter, and in this plate are slidably mounted a pair of plates 34 and 35 spaced apart a slight amount and each having a laterally projecting lug 36 for operable engagement with the operating switches 31 and 32 respectively. These plates 34 and 35 are additionally provided with elongated slots 37 therethrough and of a predetermined length, these slots being approximately centrally of the length of said plates. The plate 33 is provided with a pair of limit stops 38—39 to abut the plates 34 and 35 and stop longitudinal movement of the latter beyond set points.

An actuator plate 40 is also slidably mounted on the supporting plate 33 and is movable for a predetermined distance relatively of the plates 34 and 35, said plate 40 having a pin 41 carried thereby for reception into the slots 37 through both of the plates 34 and 35 as shown. A connecting link 42 is pivotally connected at one end to the plate 40 and at its other end is pivotally connected to the adjacent end of the tail, so that any pivotal movement of the tail or wind wheel relatively of one another will transmit a corresponding movement through the link to the actuator plate and the related switch mechanism. The actuator plate will move idly, or have play, for the initial part of its stroke, until its pin 41 engages against an end of the slots, whereupon its continued movement in the same direction will move the plates 34 and 35 along therewith for the balance of the movement of the actuator plate. The switches are oppositely set so that although both are operated in unison, one of them is being opened while the other is being closed.

The operation of the shifting mechanism is as follows:

While the wind is at or below the normal pressure considered safe for operation of the windmill, the main motor control will be at the position shown in full lines, the motor being shut off, and the switch 31 closed and the switch 32 open. The switch control plate 27 is always maintained directly into the face of the wind. As soon as the wind gets excessive in strength, it will be sufficient to shove the main circuit closer to the right, overcoming the strength of the springs 28, and whereupon it will be held in said position by the engagement of the spring and detent 29 and 30, and in that position the operative direction of rotation of the motor will be in reversed direction, and because the switch 32 has been previously left open and the switch 31 closed, the motor will immediately commence to operate, rotating the threaded screw shaft and bringing the tail and wind-wheel to lie close to one another. As this shifting takes place in said direction, the link and the actuator plate move therewith while the pin 41 travels its idling distance and then actuates both of the plates 34 and 35 together therewith for the remainder of travel of the plate 40. At substantially the end of said travel, the lugs 36 will open the switch 31 and close the switch, thus shutting off the motor. Under this condition, the rotary axis of the tail and that of the shaft 4 are approximately parallel.

As long as the wind remains excessively high, the tail will lie close against said wind-wheel, but as soon as the wind drops again to the predeterminedly safe level, the springs 28 will be sufficient to retract the main circuit closer to its initial position, and inasmuch as the switch 32 is at that time closed, the motor will rotate in the reverse direction and straighten out the shifted member, this straightening movement continuing until substantially its end, whereupon the switch 32 is opened and the switch 31 closed. It is to be pointed out at this time, that in the straightening movement, the actuator plate will first move idly or with play relative to the plates 34 and 35, and afterwards will move together therewith.

Having thus described my invention, it is obvious that various immaterial modifications may be made in the same without departing from the spirit of my invention; hence I do not wish to be understood as limiting myself to the exact form, arrangement, construction and combination of parts herein shown or described, or the uses mentioned herein, except as limited by the state of the art to which this invention appertains, or by the claims hereunto appended.

What I claim as new and desire to secure by Letters Patent is:

1. In a windmill, a wind-driven power generating wheel, a tail wheel connected thereto and wind-controlled to normally maintain one of said wheels into the face of the wind as the wind direction changes, a normally inoperative reversible motor connected between said wheels to mechanically shift the one of them relatively of the other, a pair of electrical controls for controlling the direction of rotation of said motor, and wind-controlled means for operating said electrical controls in a predetermined manner to shift one of said wheels to inoperative position during excessive wind-pressure and retrieving it at the cessation of said excessive pressure.

2. In a windmill, a wind-driven power wheel, a tail wheel connected thereto to normally keep the power wheel in the wind through changes in wind direction, a reversible motor pivotally mounted adjacent said power wheel, a pair of switches for alternately controlling the direction of rotation of said motor, a worm shaft connecting said motor and tail wheel to shift one of said wheels bodily relatively of said other wheel to an inoperative position, a wind-controlled means operative at excessive wind pressure to close the motor circuit, and means actuated at substantially the limits of travel of said wheel bodily shifted by said worm to alternately operate said switches and control the direction of motor rotation.

3. In a windmill, a framework, a wind-driven power wheel mounted thereon and rotatable to change its wind-receiving direction, a tail wheel geared to said framework and wind-controlled to move the power wheel into the wind as the wind-direction changes, a reversible-direction motor mounted on said framework, a worm-shaft connecting said motor and tail wheel to shift one of said wheels bodily of the other, a pair of circuit closers for controlling the direction of rotation of said motor, a main switch independently wind-controlled to operate one of said circuit closers at normal wind-pressures and to operate the other at an excessive wind-pressure, to operate said worm shaft, and a pair of cut-out switches mechanically operated adjacent the end of travel of said bodily shiftable wheel to stop said motor, one of said switches being in operative position when the other is in inoperative position.

4. In a windmill, a wind-driven power generating wheel, a tail wheel connected thereto and wind-controlled to normally maintain the power wheel into the face of the wind as the wind shifts, a normally inoperative reversible motor connected between said wheels to mechanically shift one of them relatively of the other, means for controlling the direction of rotation of said motor, and wind-controlled means for operating said last-mentioned means in a predetermined manner to shift said mechanically shiftable wheel to inoperative position during excessive wind-pressure and retrieving it at the cessation of said excessive pressure.

HUGO A. J. THIESEN.